(12) United States Patent
Horng et al.

(10) Patent No.: US 6,570,835 B1
(45) Date of Patent: May 27, 2003

(54) SUPPORT STRUCTURE FOR COMPACT DISC

(75) Inventors: Alex Horng, Kaohsiung (TW); Hunter Hsieh, Kaohsiung Hsien (TW); Guo-Shiang Chen, Penghu Hsien (TW)

(73) Assignee: Eutronic Technology Company Ltd., Kaohsiung (TW)

( * ) Notice: Subject to any disclaimer, the term of this patent is extended or adjusted under 35 U.S.C. 154(b) by 147 days.

(21) Appl. No.: 09/783,546

(22) Filed: Feb. 15, 2001

(51) Int. Cl.[7] ............................................... G11B 25/00
(52) U.S. Cl. ....................................... 369/270; 369/271
(58) Field of Search ................................. 369/270, 271, 369/282, 289, 264

(56) References Cited

U.S. PATENT DOCUMENTS

| 4,737,948 A | * | 4/1988 | Okita | 369/270 |
| 5,761,186 A | * | 6/1998 | Mushika et al. | 369/271 |
| 6,038,206 A | * | 3/2000 | Mukawa | 369/271 |
| 6,041,033 A | * | 3/2000 | Otsubo et al. | 369/271 |
| 6,108,294 A | * | 8/2000 | Iwanaga | 369/270 |
| 6,363,048 B1 | * | 3/2002 | Wu et al. | 369/271 |
| 6,487,162 B1 | * | 11/2002 | Wu et al. | 369/271 |
| 6,510,123 B1 | * | 1/2003 | Kammerer | 369/271 |

* cited by examiner

Primary Examiner—Allen Cao
(74) Attorney, Agent, or Firm—Bacon & Thomas, PLLC

(57) ABSTRACT

A compact disc support structure includes a spindle motor, a carrier, a hub, and a plurality of snapping members. The carrier is combined with the spindle motor. The hub is fitted and fixed on the shaft of the spindle motor. The snapping member is received in the chamber of the hub and is provided with a protrusion protruding outward from the opening of the chamber of the hub. When a compact disc is fitted on the periphery of the hub and is placed on the carrier, the compact disc is snapped and fixed by the protrusion of the snapping member so that the compact disc can be rigidly fixed on the carrier to be rotated with rotation of the spindle motor.

9 Claims, 6 Drawing Sheets

SUPPORT STRUCTURE FOR COMPACT DISC

BACKGROUND OF THE INVENTION

1. Field of the Invention

The present invention relates to a support structure for a compact disc, and more particularly to a compact disc support structure which utilizes snapping members for snapping and fixing a compact disc on a carrier.

2. Description of the Related Prior Art

A conventional compact disc support structure in accordance with the prior art shown in FIG. 1 comprises a spindle motor 10 having a shaft 11, a carrier 20, an elastomer 30, a hub 40, and a plurality of snap rolling balls 50. The carrier 20 is combined with the spindle motor 10 to rotate therewith. The hub 40 is provided with a plurality of cuts 41 for receiving the snap rolling balls 50, and for limiting the snap rolling balls 50 in the hub 40. The elastomer 30 is provided in the hub 40, and is radially and outwardly rested on the snap rolling balls 50. When a compact disc is provided, the inner hole of the compact disc is fitted on the periphery of the hub 40, and is placed on the carrier 20. In the meanwhile, the elastomer 30 is urged on the snap rolling balls 50 so that the compact disc can be snapped and positioned on the carrier 20 by the snap rolling balls 50. In such a manner, when the spindle motor 10 is rotated, the compact disc is rotated simultaneously. However, the conventional compact disc support structure has a complicated construction and is not easily assembled, thereby increasing the cost of fabrication.

SUMMARY OF THE INVENTION

The primary objective of the present invention is to provide a compact disc support structure which has a simple construction, is assembled easily, and can save the cost of fabrication.

In accordance with the present invention, the compact disc support structure comprises a spindle motor, a carrier, a hub, and a plurality of separate snapping members. The hub defines an axial hole and a plurality of chambers, and the plurality of chambers form a plurality of openings on the periphery of the hub. Preferably, the snapping member is integrally formed of a metallic piece bent by a punching process or integrally formed of plastic material, and has a deformation elasticity. Each of the snapping members is provided with a protrusion having an arcuate surface. When the snapping member is placed in the chamber of the hub, the snapping member has two distal ends each elastically pressing on the inner wall of the chamber of the hub so as to fix or retain the snapping member therein while the protrusion radially protrudes outward from the opening of the chamber of the hub. When a pressure is exerted on the arcuate surface of the protrusion of the snapping member, the protrusion will be deformed, that is, the protrusion will retract radially and inwardly. When a disc is placed on the support structure of the present invention, the protrusion of the snapping member will retract into the chamber of the hub by compression of the inner edge of the inner hole of the compact disc. The protrusion will return to its original position when the compact disc passes the protrusion. The restored protrusion can be used to snap and fix the compact disc on the carrier. When the spindle motor is rotated, the carrier will carry the compact disc to rotate simultaneously. Accordingly, the present invention has reduced parts, and is easily assembled, therefore, the present invention has the effects of decreasing the cost and increasing the productivity.

Further benefits and advantages of the present invention will become apparent after a careful reading of the detailed description with appropriate reference to the accompanying drawings.

DETAILED DESCRIPTION OF THE PREFERRED EMBODIMENTS

Figure 2:
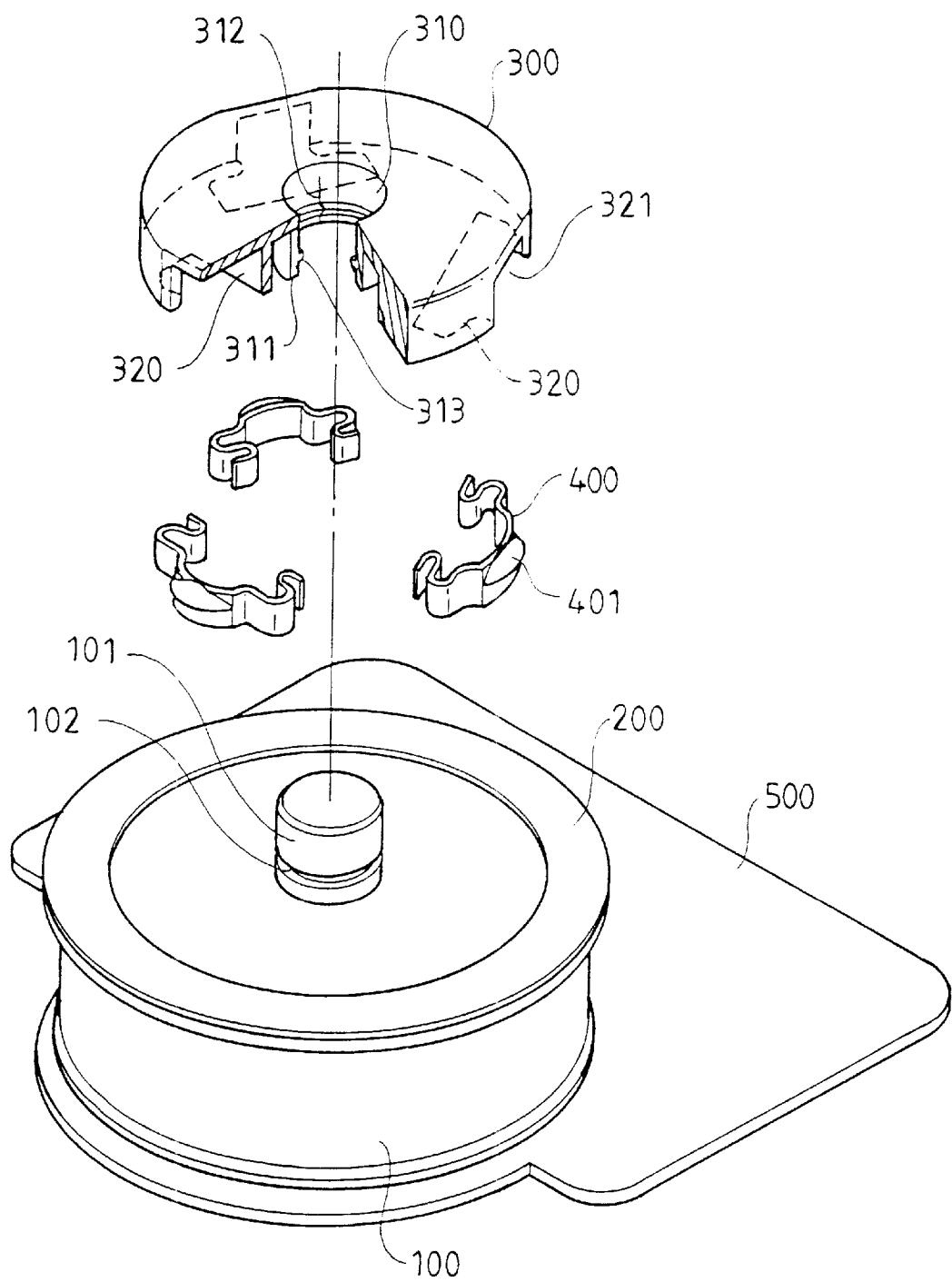
FIG. 2 is an exploded perspective view of a compact disc support structure in accordance with a preferred embodiment of the present invention.

Referring to the drawings and initially to FIG. 2, in accordance with the preferred embodiment of the present invention, a compact disc support structure comprises a spindle motor 100, a carrier 200, a hub 300, and a plurality of snapping members 400. The spindle motor 100 may be provided and fixed on a circuit base plate 500, and the top face of the spindle motor 100 may be combined with the carrier 200. The spindle motor 100 is provided with a shaft 101 at the center thereof, and the shaft 101 is provided to be fitted in the axial hole 310 of the hub 300 so that the hub 300 is combined with the spindle motor 100. Preferably, the hub 300 is integrally formed of plastic material, and is provided with an axial hole 310 at the center thereof. The axial hole 310 of the hub 300 is preferably formed with an annular wall 311, and the annular wall 311 of the hub 300 itself is provided with at least three slits 312 at a proper span so that the annular wall 311 can be elastically expanded and contracted. The annular wall 311 has an inner surface provided with a flange 313. The shaft 101 of the spindle motor 100 is preferably provided with an annular groove 102. When the hub 300 is combined with the spindle motor 100, the annular wall 311 of the hub 300 is fitted on the shaft 101 while the flange 313 of the annular wall 311 can be inserted into the annular groove 102 of the shaft 101 to snap and fix the hub 300 on the shaft 101 of the spindle motor 100. In addition, A plurality of chambers 320 are provided on the periphery of the axial hole 310, and the plurality of chambers 320 form a plurality of openings 321 on the periphery of the hub 300. Preferably, each of the snapping members 400 is integrally formed of a metallic piece bent by a punching process or integrally formed of plastic material, and has a deformation elasticity. Each of the snapping members 400 is provided with a protrusion 401 having an arcuate surface.

Figure 3:
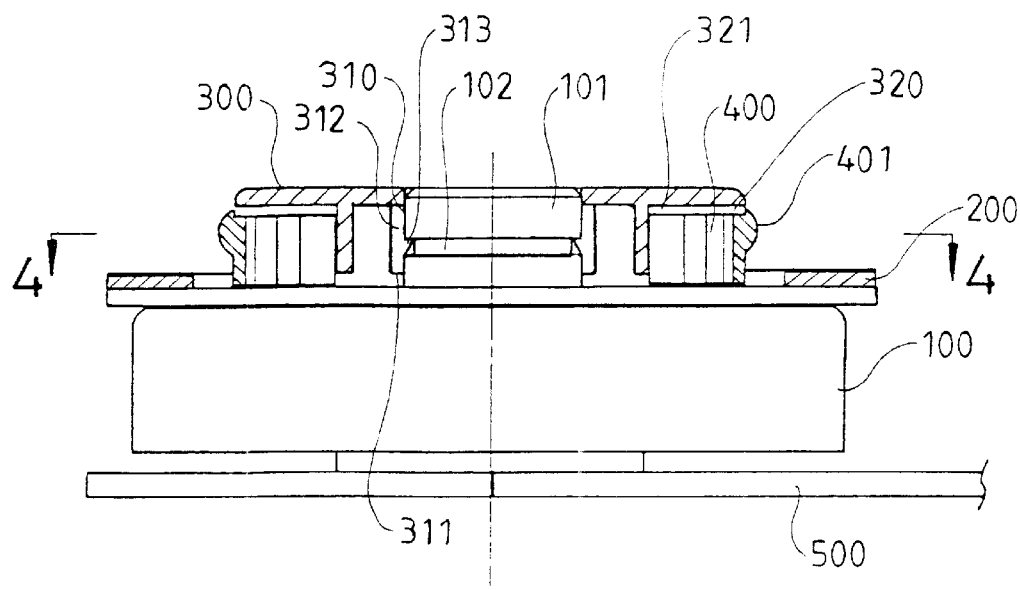
FIG. 3 is a locally cross-sectional sectional view of the compact disc support structure in accordance with the preferred embodiment of the present invention.

Referring to FIG. 3, wherein FIG. 3 shows the assembly diagram of the present invention. When the snapping member 400 is received in the chamber 320 of the hub 300, the snapping member 400 has two distal ends each rested on the inner wall of the chamber 320 of the hub 300 so as to be fixed therein while the protrusion 401 radially protrudes outward from the opening 321 of the chamber 320 of the hub 300. The surface of the protrusion 401 is an arcuate surface. When the protrusion 401 is pressed, it will retract into the chamber 320 of the hub 300 radially and inwardly.

Figure 4:
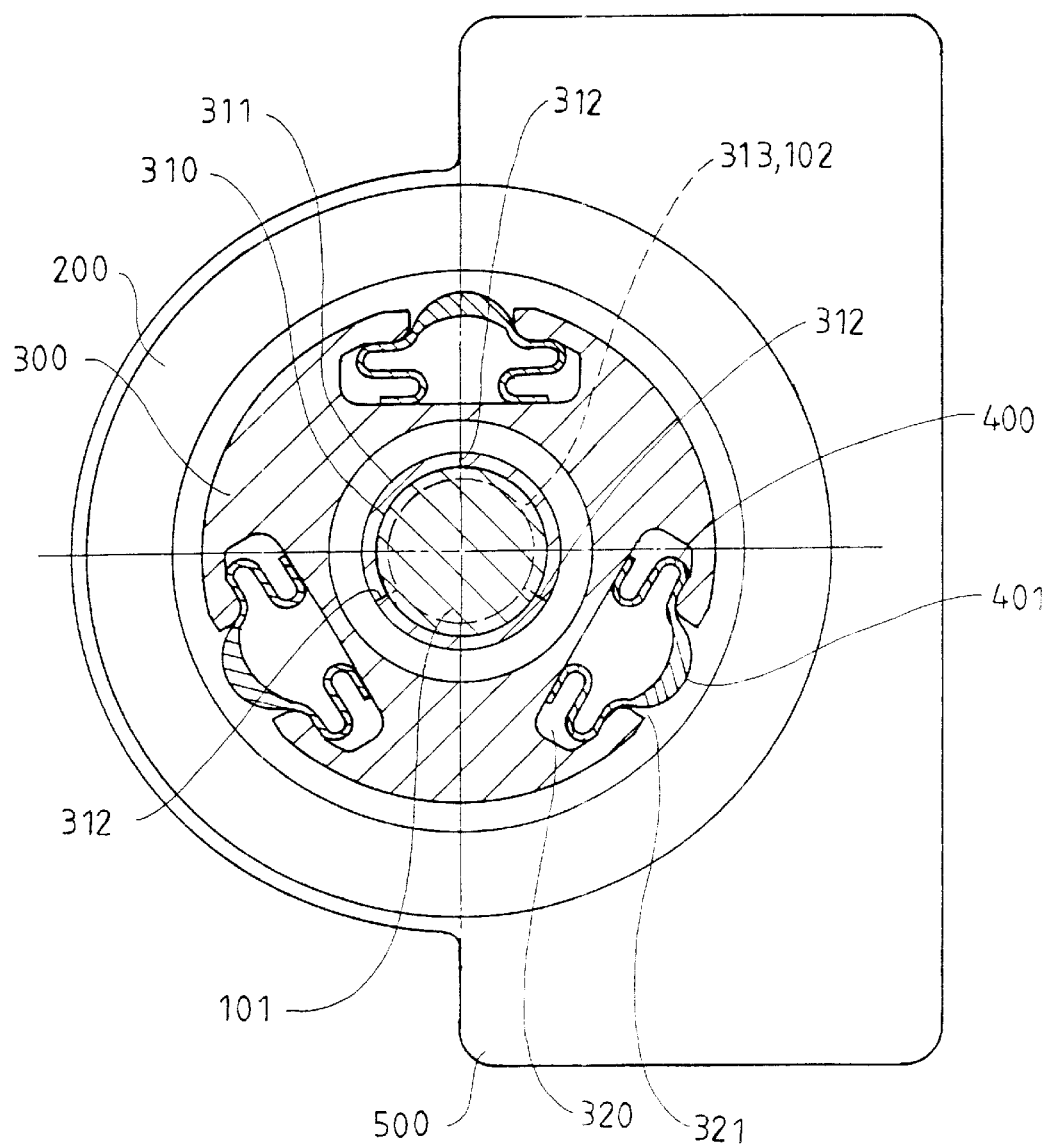
FIG. 4 is a cross-sectional view of the compact disc support structure along line 4—4 as shown in FIG. 3, showing the snapping members being not under the pressure.
Figure 5:
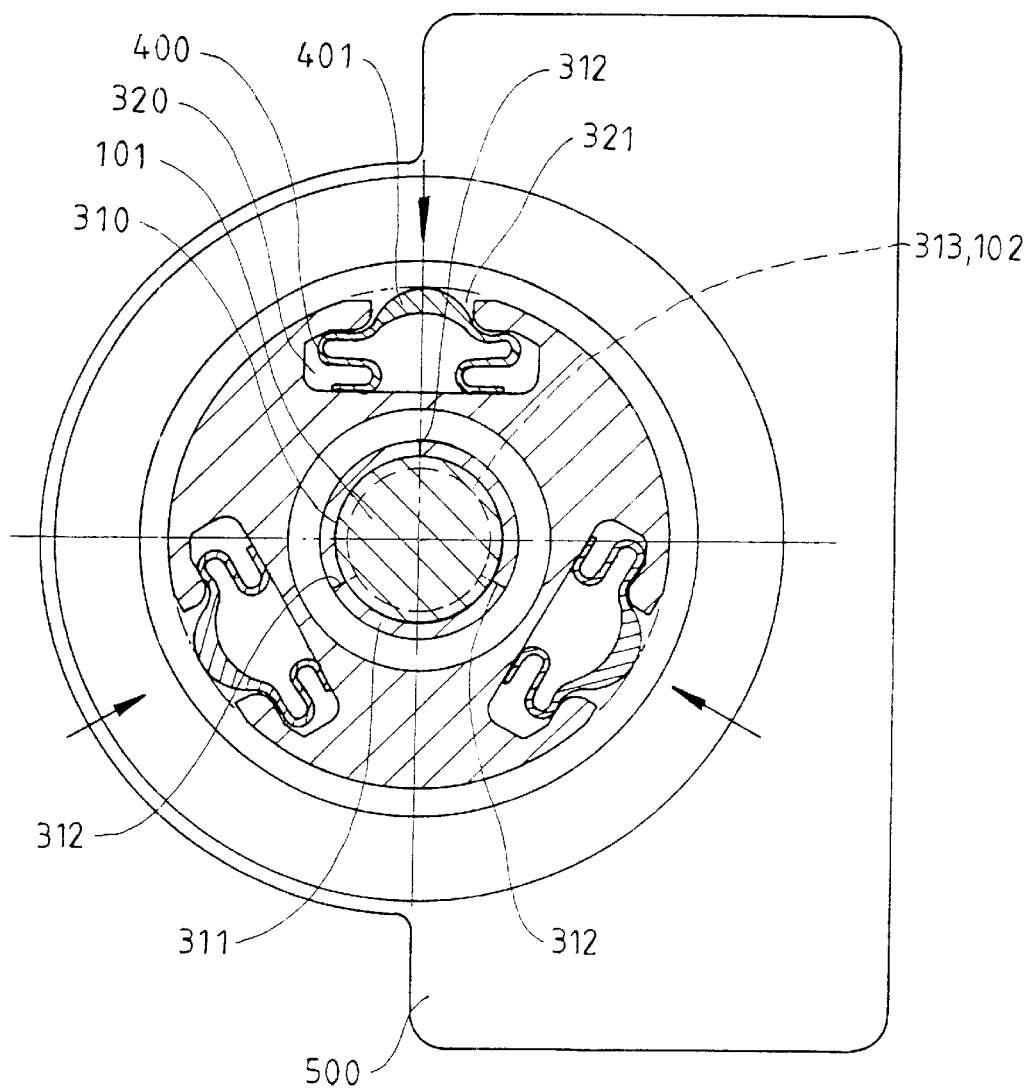
FIG. 5 is a cross-sectional view of the compact disc support structure along line 4—4 as shown in FIG. 3, showing the snapping members being under the pressure.

Referring to FIGS. 4 and 5, wherein FIGS. 4 and 5 show the operation schematic diagram of the present invention. The protrusion 401 of the snapping member 400 initially protrudes outward from the opening 321 of the chamber 320 of the hub 300. When a pressure is exerted on the surface of the protrusion 401 of the snapping member 400, the protrusion 401 will radially retract toward the chamber 320 of the hub 300, that is, the protrusion 401 will retract into the chamber 320 of the hub 300. When the pressure is released, the protrusion 401 of the snapping member 400 is returned to its original position and again protrudes outward from the opening 321 of the chamber 320 of the hub 300.

Figure 6:
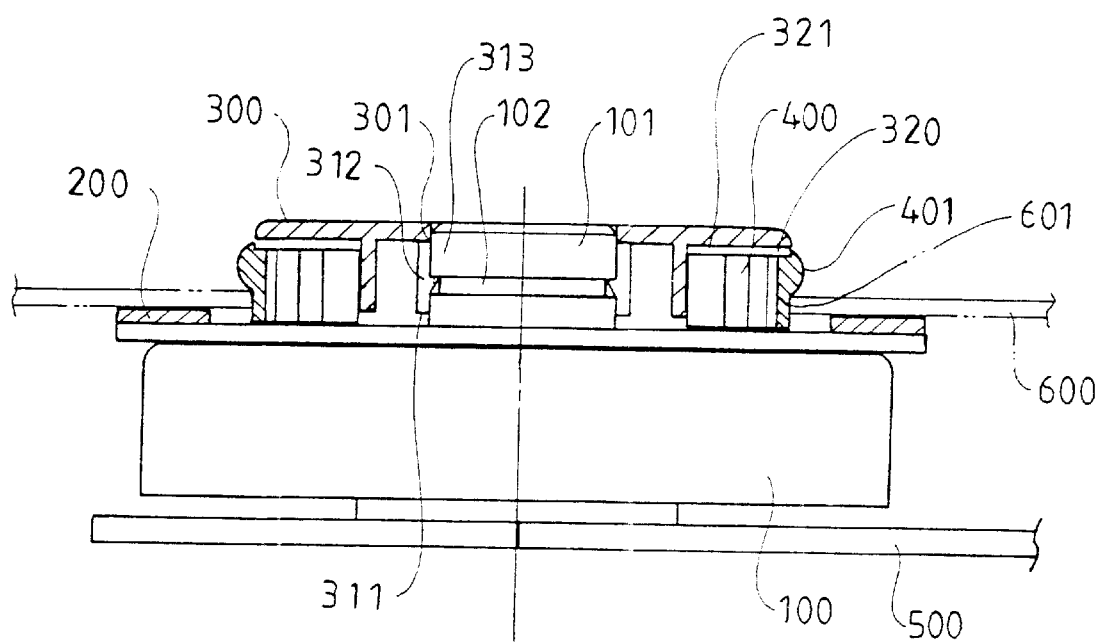
FIG. 6 is a locally cross-sectional sectional view showing a compact disc being placed on the compact disc support structure in accordance with the preferred embodiment of the present invention.

Referring to FIG. 6, when a disc 600 is placed on the support structure, the compact disc 600 defines an inner hole 601 which is fitted on the periphery of the hub 300 and is supported on the carrier 200. The inner hole 601 has a diameter slightly smaller than a diameter of a circumference formed by the protrusions 401 of the snapping members 400 protruding outward from the opening 321 of the hub 300 so that the protrusion 401 of the snapping member 400 will retract into the chamber 320 of the hub 300 by compression of the compact disc 600 whereby the compact disc 600 may pass the protrusion 401. The protrusion 401 will return to its original position when the compact disc 600 passes the protrusion 401. The restored protrusion 401 can be used to snap and fix the compact disc 600 on the hub 300. When the spindle motor 100 is rotated, the carrier 200, the hub 300, and the compact disc 600 will be rotated simultaneously.

Figure 1:
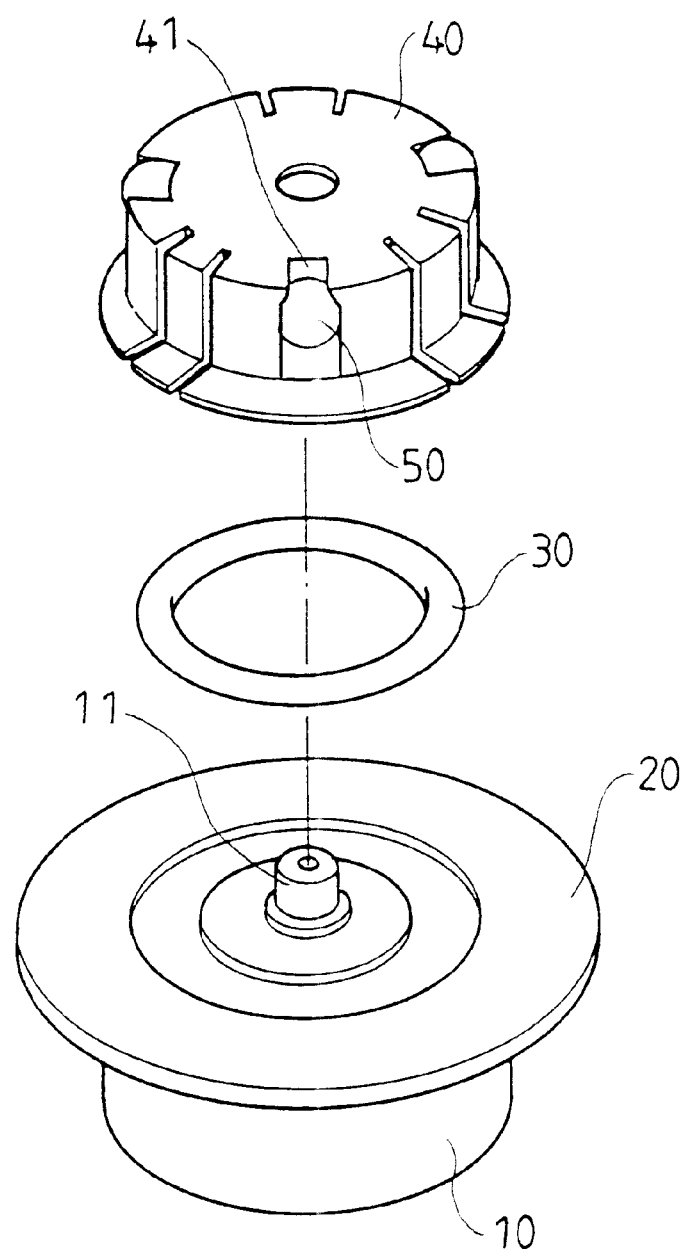
FIG. 1 is an exploded perspective view of a conventional compact disc support structure in accordance with the prior art.

Again referring to the conventional compact disc support structure as shown in FIG. 1, the conventional compact disc support structure essentially comprises a spindle motor 10, a carrier 20, an elastomer 30, a hub 40, and a plurality of snap rolling balls 50. In comparison, the compact disc support structure in accordance with the present invention essentially comprises a spindle motor 100, a carrier 200, a hub 300, and a plurality of snapping members 400. Therefore, the present invention needs not to additionally provide the elastomer 30. In addition, during the assembling process, the snapping member 40 of the present invention is more easily assembled than the snap rolling balls 50. Accordingly, the compact disc support structure of the present invention has the effects of simplifying the construction, reducing the parts, being easily assembled, saving the required material, and increasing the productivity.

Although the invention has been explained in relation to its preferred embodiment as mentioned above, it is to be understood that many other possible modifications and variations can be made without departing from the scope of the present invention. It is, therefore, contemplated that the appended claim(s) will cover such modifications and variations that fall within the true scope of the invention.

What is claimed is:

1. A compact disc support structure comprising:
   a spindle motor provided with a shaft;
   a carrier combined with the spindle motor;
   a hub defining an axial hole and a plurality of chambers, the plurality of chambers forming a plurality of openings on a periphery of the hub, the axial hole of the hub fitted on the shaft of the spindle motor; and
   a plurality of separate snapping members each received in a respective one of the chambers of the hub and each provided with a protrusion protruding outward from the opening of the respective chamber of the hub so that the protrusion is able to be pressed inward for snapping a compact disc on the carrier.

2. The compact disc support structure as claimed in claim 1, wherein each of the snapping members is integrally formed of plastic material and has a deformation elasticity.

3. The compact disc support structure as claimed in claim 1, wherein each of the snapping members is integrally formed of a metallic piece and has a deformation elasticity.

4. The compact disc support structure as claimed in claim 1, wherein each of the snapping members has two distal ends, each of the two distal ends elastically pressing on an inner wall of the respective chamber of the hub so as to fix the respective snapping member therein.

5. The compact disc support structure as claimed in claim 1, wherein the protrusion of each of the snapping members has a surface formed with an arcuate face.

6. The compact disc support structure as claimed in claim 1, wherein the compact disc defines an inner hole having a diameter slightly smaller than a diameter of a circumference formed by the protrusions of the snapping members protruding outward from the opening of the hub.

7. The compact disc support structure as claimed in claim 1, wherein the axial hole of the hub is provided with an annular wall, the annular wall having an inner surface provided with a flange, the shaft of the spindle motor provided with an annular groove, the flange of the annular wall being able to be inserted into the annular groove of the shaft to be positioned therein.

8. The compact disc support structure as claimed in claim 1, wherein the annular wall of the hub is provided with at least three slits so that the annular wall is able to be elastically expanded and contracted.

9. The compact disc support structure as claimed in claim 1, wherein each of the snapping members includes two distal ends symmetrically extending therefrom to provide a symmetrically elastic force for retaining said snapping members in respective said chambers.

* * * * *